Feb. 20, 1934. J. MIHALYI 1,947,483
SELF THREADING CAMERA
Filed Feb. 6, 1933  4 Sheets-Sheet 1

Inventor:
Joseph Mihalyi,
By
Attorneys

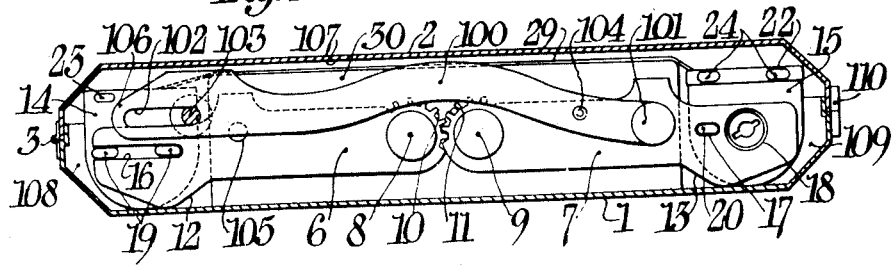
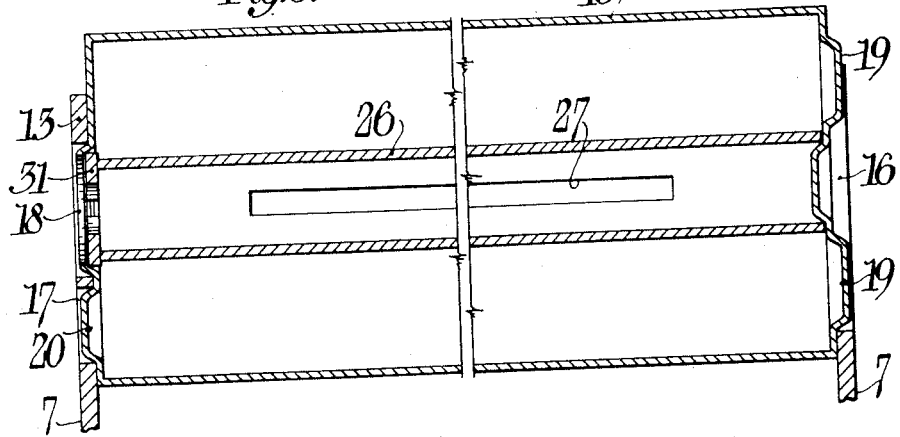
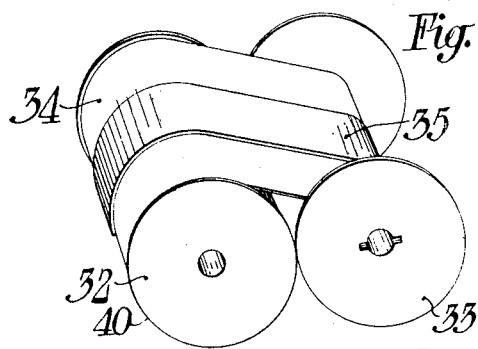
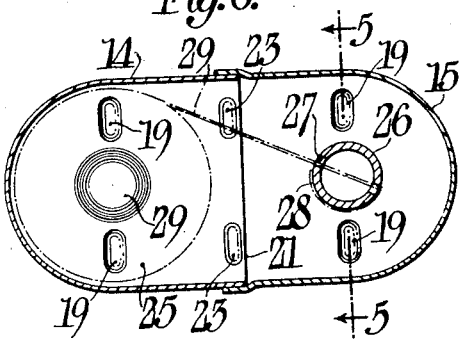
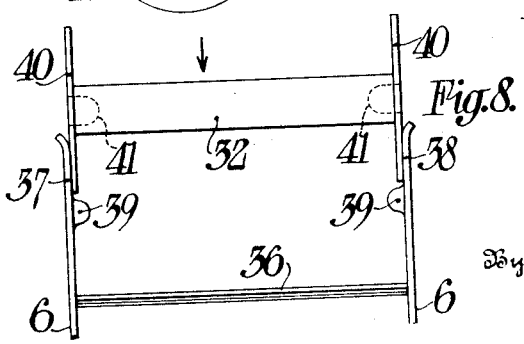

Feb. 20, 1934.   J. MIHALYI   1,947,483
SELF THREADING CAMERA
Filed Feb. 6, 1933   4 Sheets-Sheet 3
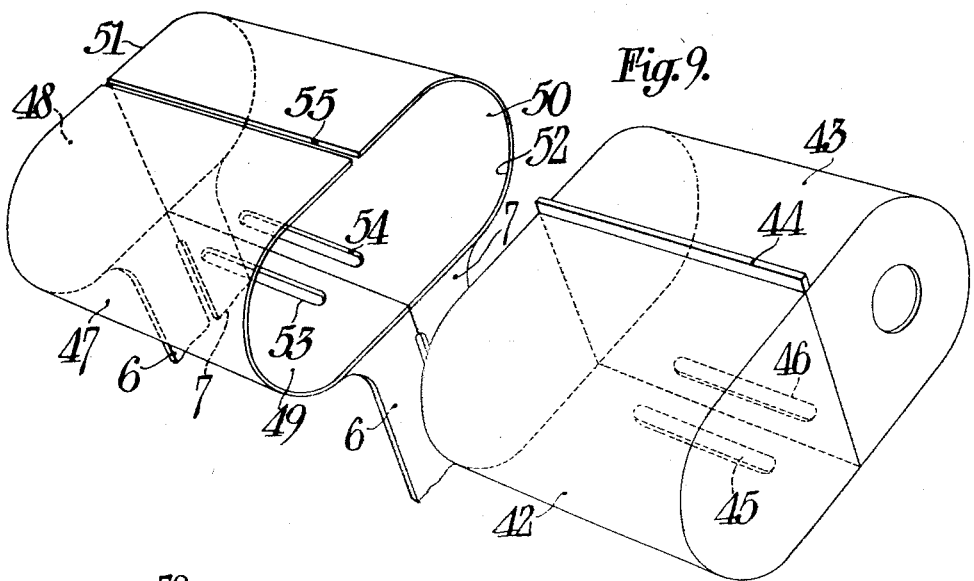
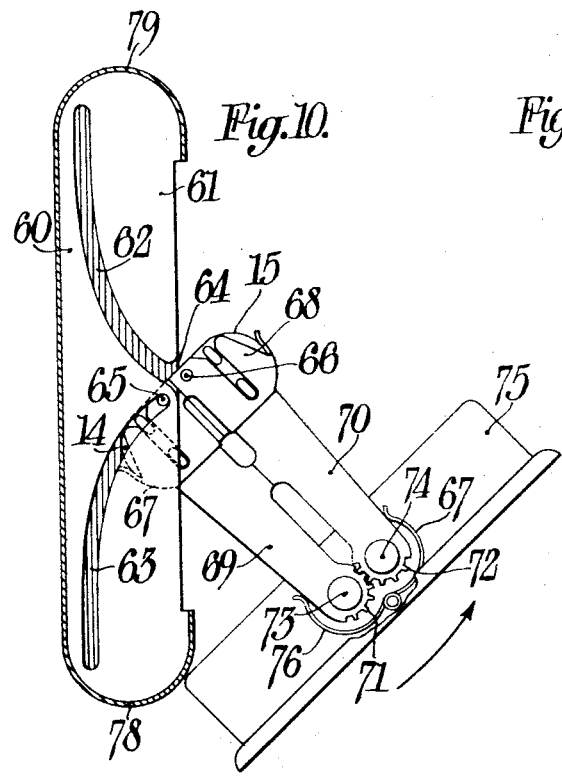
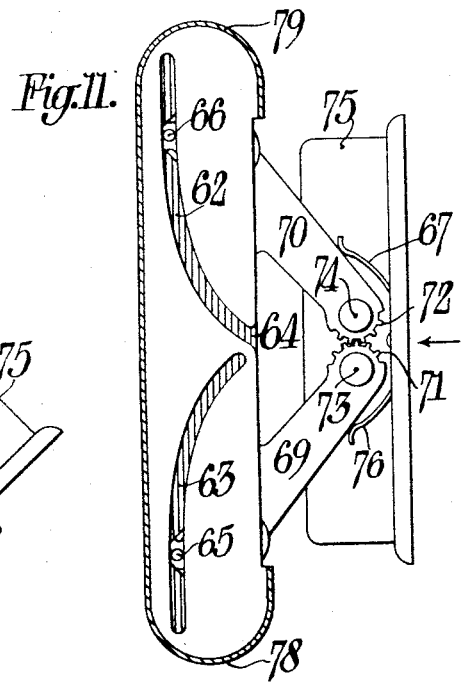
Inventor:
Joseph Mihalyi,
By
Attorneys

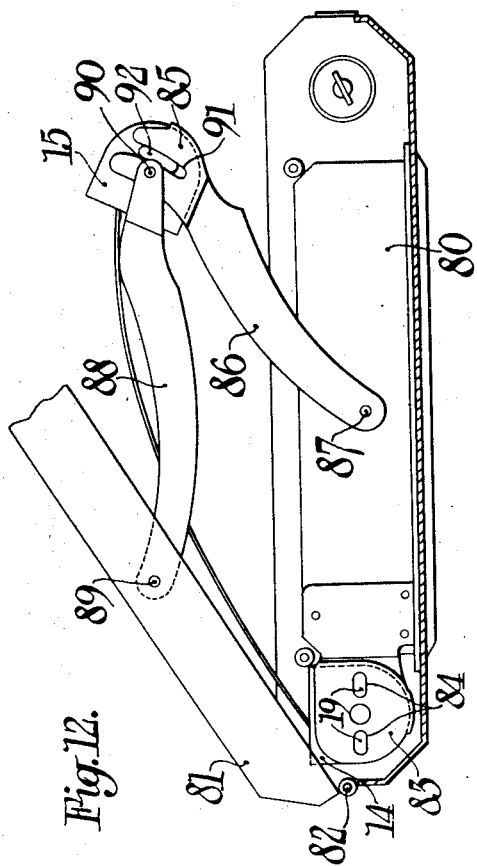
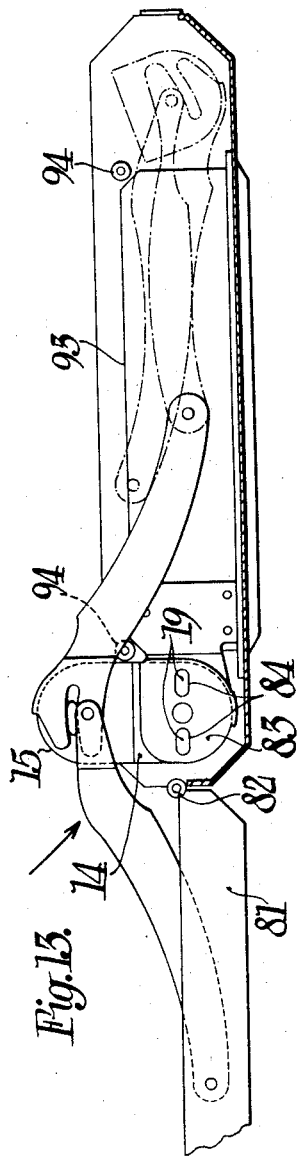

Patented Feb. 20, 1934

1,947,483

UNITED STATES PATENT OFFICE 1,947,483

SELF-THREADING CAMERA

Joseph Mihalyi, Rochester, N. Y., assignor to Eastman Kodak Company, Rochester, N. Y., a corporation of New York Application February 6, 1933. Serial No. 655,382

23 Claims. (Cl. 95—32)

This invention relates to photography and more particularly to photographic cameras. One object of my invention is to provide a camera in which loading and unloading of roll film into the camera is greatly facilitated. Another object of my invention is to provide a camera in which a single package may be placed in a single operation and in which the strip material may be stretched across the exposure frame of a camera by moving a part of the camera. Another object of my invention is to provide a camera with a pair of movable holding devices adapted to receive parts of a roll holder and to move them in such a way that strip material is stretched across the exposure frame automatically without further attention by an operator. Another object of my invention is to provide a camera with a film holding structure which will automatically enclose the film in a light-tight container after the film has been exposed in the camera, and so that the container can be removed as a unit. Still another object of my invention is to provide a camera in which the loading and unloading operations are reduced to a minimum, and other objects will appear from the following specification, the novel features being particularly pointed out in the claims at the end thereof.

With the usual type of roll holding cameras, two film spools are used, one being filled with convolutions of film and backing paper and the other spool normally being empty but having a means to which the end of the backing paper must be manually attached. The two film spools must be inserted in the spool chambers at opposite ends of an exposure frame across which the film is drawn for exposure, and the operations in loading and unloading a camera consume considerable time and with some cameras require quite a little skill. There is always danger in the manual threading of such film spool cameras of permitting the convolutions of strip material to become loosened from the supply roll while threading up the end of the backing paper to the take-up roll and thus accidentally exposing some of the film to light. There is also liable to be some difficulty in unloading the regular camera. Since the film convolutions are not always wound tightly upon the take-up roll when removing the take-up spool from the camera, fogging may also occur. If the film backing paper is drawn tightly to draw the convolutions closer together, there is also the possibility of producing what is generally known as "cinch" marks. In a camera construction in accordance with my present invention all these difficulties are overcome.

Coming now to the drawings wherein like reference characters denote like parts throughout:

Figure 4 is a section through the camera shown in Figure 1 but with the parts in an operative position, and showing the strip material stretched across the exposure frame.

Figure 5 is an enlarged sectional view taken on line 5—5 of Figure 6.

Figure 6 is a sectional view through a preferred form of film magazine which may be used in the camera shown in Figure 1.

Figure 7 is a perspective view of another type of film package which may be used with a camera constructed in accordance with a second embodiment of my invention.

Figure 8 is a fragmentary detail view of a film holder constructed in accordance with a second embodiment of my invention.

Figure 9 is a perspective view showing a fragmentary part of a film holder and film container constructed in accordance with still another embodiment of my invention.

Figure 10 is a sectional view of a camera constructed in accordance with still another embodiment of my invention with the parts in an open or loading position.

Figure 11 is a view of the camera shown in Figure 10 partially in section but with the camera in a partially closed position.

Figure 12 is a view partially in section showing still another camera constructed in accordance with my invention.

Figure 13 is a view partially in section of the camera shown in Figure 12, but with the parts in a loading or unloading position.

Figure 1:
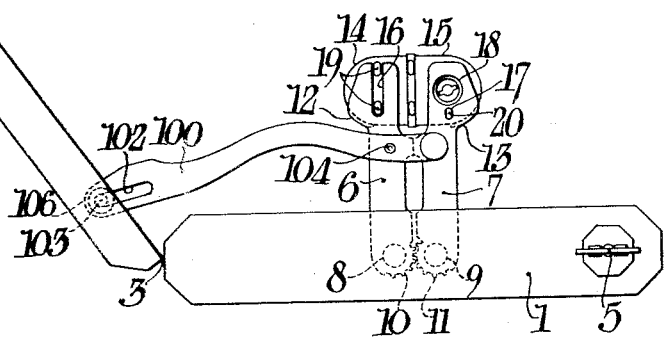
Figure 1 is a side elevation of a preferred embodiment of my invention, the camera being shown opened in a loading and unloading position.

I have illustrated a number of forms of my invention in the accompanying drawings and from these various forms, it can be seen that my invention broadly comprises providing a camera in which a pair of film holders are mounted, at least one of which is movably mounted so that the two film holders may be automatically brought into a position adjacent each other for receiving and for discharging a special type of film magazine or film package. The means for moving one or more of the film holding devices may be a part of the camera. Thus, as illustrated in Figure 1, the camera back may be used to operate the holding devices to and from a loading and operating position in which the spool holders lie in the camera spool chambers and in which the strip material is stretched across the usual exposure frame.

The movable part of the camera need not necessarily be the camera back, but can be the front of the camera, if desired, as is also illustrated by the drawings as in Figures 10 and 11. Thus, it is only necessary to provide a camera with two relatively movable parts, one of which is adapted to operate through a suitable linkage one or more spool holding devices.

Referring now particularly to my invention as disclosed in the first four figures in the drawings in which a preferred embodiment of my invention is shown, there may be a camera body 1 having a back 2 hinged by means of hinge member 3. The camera back 2 may be adapted to telescope a section 4 of the camera body in the usual manner. The camera body 1 may carry a winding key 5 of the usual type which can be moved to and from an operative position. The camera body carries a pair of hinged arms 6 and 7 pivotally mounted upon the studs 8 and 9 on each side of the camera body 1, and also being geared together by the intermeshing gears 10 and 11. Thus, when one of these arms move, both must move.

On the upper ends of the arms 6 and 7 are carried a pair of film holders designated broadly as 12 and 13, these holders comprising walls which closely engage a special type of film spool magazine or package which is made in two parts, 14 and 15. The spool holders 12 and 13 are provided with slots, such as 16 and 17, and the winding key is provided with an aperture 18. The slots 16 and 17 are adapted to receive formings 19 and 20 on the film magazine sections 14 and 15, so that these sections will be definitely located in and held by the holding means.

The magazine sections 14 and 15 are shallow, cup-shaped members, as best shown in Figures 5 and 6, and they may be held together by means of the flange 21 of section 14 engaging in the flange 22 of section 15. The sections are normally held together by means of a snap-latch which in this instance comprises formings 23 on section 14 which are adapted to snap into complementary-shaped formings 24 on section 15. Thus, while the sections 14 and 15 are normally held together by means of these snap-latches, only a slight effort is required to pull the two sections apart.

In order to automatically thread the camera, the arms 6 and 7 may be moved by means of the camera back 2 through the lever 100 pivotally attached at 101 to the arm 7 and having a slot 102 attached to a stud 103 on the camera back. This stud and slot permit some lost motion of the cover relative to the camera body. The arm 101 also has a protuberance 104 adapted to snap into an aperture 105 on arm 6, thus forming a snap-latch which will retain the arms 6 and 7 in an adjacent position in which the film spool magazine 14 and 15 can be readily and quickly loaded into place. With the parts shown as in Figure 1, the camera back may be closed. The first part of the closing movement permits the end 106 of the lever 100 to ride upon the stud 103 until it strikes the inside 107 of the camera back. Continued movement separates the arms 6 and 7 until they move down into the spool chambers 108 and 109 of the camera body. When the back has been completely closed, it may be held in a closed position in any well-known manner as by a suitable latch 110.

Referring to Figure 6, it will be noted that the film and backing paper may be coiled together in a loose coil, as indicated at 25, either with or without a hub member. Section 15 may contain a hub member 26 slotted at 27 in the usual manner into which the end 28 of the strip material 29 may pass. This strip material may comprise either film and backing paper, film alone, (with a light-proof backing) or film backing paper and carbon paper. All of these types of strip material are well known in the art.

Figure 2:
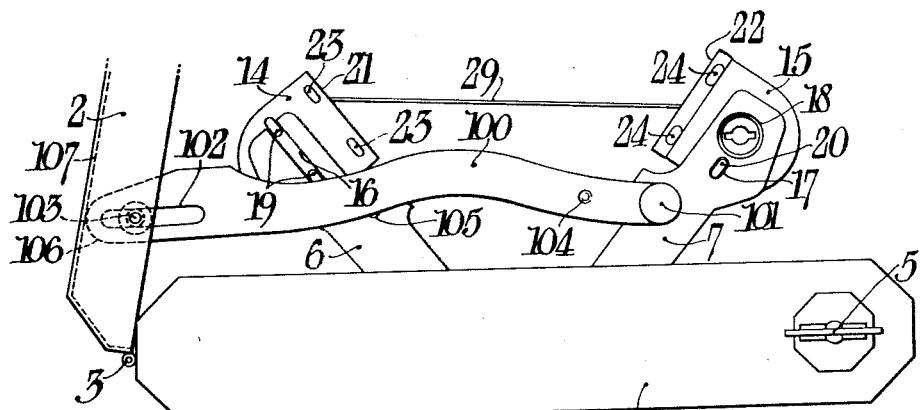
Figure 2 is a side elevation of the camera shown in Figure 1 in a partially opened position and shown on a somewhat larger scale.
Figure 3:
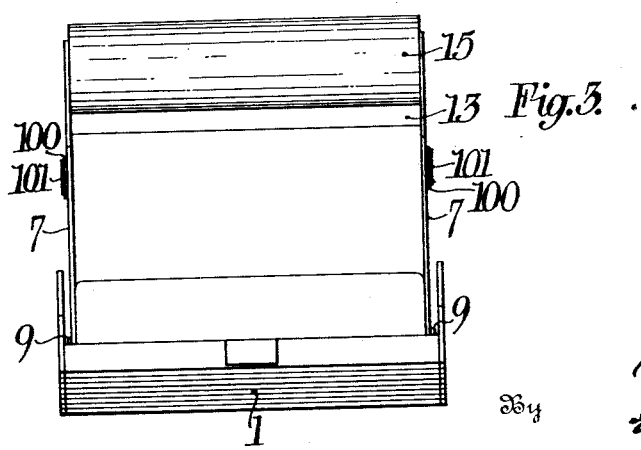
Figure 3 is an end elevation of the camera shown opened as in Figure 1.

The loose coil of film 25 may be held in place by formings 29 extending into the inner convolutions of strip material. Thus, when the magazine is placed in the holding devices, shown in Figure 1, and the camera is closed by swinging the back 2 toward the body 1, arms 6 and 7 being geared together simultaneously swing downwardly, as indicated in Figure 2, until they reach the position shown in Figure 4 in which the strip material 29 has been stretched across the exposure frame 30. The loading operation, therefore, consists solely in placing the magazine 14—15 into the holders 12 and 13 and closing the back of the camera.

The winding key is then moved into engagement with the end 31 of the core 26 and the strip material may be wound through the camera in the usual manner, making the usual exposures. After all of the strip material has been wound upon the hub 26, the camera may be unloaded by swinging the back open from the position shown in Figure 4 to that shown in Figure 1. This operation brings the two magazine sections 14—15 together and the snap-latch 23—24 becomes engaged so that the magazine sections 14 and 15 are held together in a position to be removed from the camera. Thus, it will be seen that it is only necessary to open the camera to load and unload it with film, and that all the bother of placing the film spools in the film chambers, stretching the strip material across the exposure frame, and threading it into a take-up spool is eliminated.

The embodiment of my invention just described is a preferred embodiment, but there are many ways that my invention can be carried out. For instance, the film package, which is made the subject matter of another application, Serial No. 655,381 filed February 6, 1933 may take different forms. The film package itself may, as indicated in Figure 7, comprise two spools 32 and 33, spool 32 being wound with convolutions 34 of strip material, the end of which is attached to the hub of spool 33. These two spools may be held in the position shown in Figure 7 by means of a suitable spring clip 35.

For such a film package, a slightly different type of film holder is required. The arms 6 and 7 of the camera, shown in Figure 1, may be equipped with a well-known type of spool centering device, such as shown in Figure 8. These arms may be connected by means of a cross-bar 36 and the upward extensions 37 and 38 may be provided with rounded film engaging protuberances 39. When a spool, such as spool 32, for instance, is moved downwardly in the direction shown by the arrow in Figure 8, the protuberances 39 will spring outwardly as they ride over the flanges 40 of the spool until the spool reaches a position in which the apertures 41 may snap over the protuberances 39.

With this type of film package, the spring clip 35 must be removed as the two spools are simultaneously thrust into the holding devices. However, after all of the exposures are made and the camera back is opened to place the spool holding devices adjacent each other, all of the film may be wound upon the take-up spool 33 and spool 32 may be thrown away.

Still another type of film package is indicated in Figure 9 wherein the two sections 42 and 43 may be elongated cup-shaped members like the first described embodiment of my invention shown in Figure 6, but one of these members may be provided with a flange 44. Each of these members is provided with an outwardly formed rib 45 and 46. Instead of being placed downwardly into the spool holders with this type of film package, the arms 6 and 7 must be provided with a different type of package receiving receptacle. As indicated in Figure 9, the receptacle for the package just described may consist of two members shaped very much like the spool magazine, that is, the arm 6 may support a curved wall 47 having one end wall 48 and one open end 49. The arm 7 may support a similar curved wall 50 having a closed end 51 and an open end 52. Each of the curved walls is provided with a slot 53 and 54, the former being adapted to receive the rib 45 of magazine section 42, and the latter being adapted to receive rib 46 of the magazine section 43.

In order to load this film magazine into the film receptacle, the rib 44 is brought into engagement with a slot 55 extending between the ends of the curved walls 47 and 50. This rib forms a guideway which prevents the magazine from being improperly inserted into the camera, and the magazine can be slid into the receptacle until the ribs 45 and 46 snap into the slots 43 and 45. Thus, the entire operation of loading this type of film container into the camera consists in sliding the package endwise into the film holder. The camera back may be then opened to stretch the strip material across the exposure frame, as described in the first embodiment of my invention, and, as also described in the first embodiment of my invention, the parts can be returned to their original position by merely opening the back of the camera.

There are quite a number of different camera constructions which can be used in accordance with my invention. For instance, in a well-known camera, a removable back is not provided for loading the film into place, but the front of the camera can be moved from the camera body for loading. Where it is desired to equip this type camera with the loading feature which I have invented, the structures shown in Figure 10 and 11 may be employed.

As indicated in Figure 10, the camera body may consist of a body portion 60 having walls 61 in which a pair of cam slots are cut, 62 and 63, these cam slots being covered by the end walls of the camera. Cam slot 62 opens through the outer edge 64 of the camera but cam slot 63 terminates before the edge is reached. These two cam slots constitute guideways for pins 65 and 66 which are carried by the holding devices 67 and 68. It will not be necessary to go into a detailed description of the holding devices 67 and 68, since they are identical in construction to the holding devices 14 and 15 described with reference to the first four figures. Holding devices 67 and 68 are carried by arms 69 and 70 geared together by gears 71 and 72 pivotally mounted on studs 73 and 74 on the front member 75 of the camera. A spring, having two ends 76 and 77, tends to move the arms 69 and 70 toward each other.

In loading a camera of this type, the film package, consisting of sections 14 and 15, is slid into the spool holders when the camera parts are in the position shown in Figure 10. The camera may be closed by first swinging the camera front 75 in the direction shown by the arrow until the pin 66 lies in the end of cam slot 62. The camera front, as indicated in Figure 11, is then moved in the direction shown by the arrow in that figure, into the camera body. This movement causes pins 65 and 66 to run through the cam slots 62 and 63, causing the magazine sections 14 and 15 to separate from each other and pass up into the spool chambers which lie inside of the curved walls 78 and 79 of the camera. Thus, as in the first described embodiment of my invention, it is only necessary to move one movable camera part relative to a fixed camera part to stretch the strip material taut for exposure.

Another type of camera can be easily made in which only one spool holding device needs to move relative to the other. Referring to Figures 12 and 13, the camera may consist of a body portion 80 to which a cover 81 is hinged at 82. A film package may consist of parts 14 and 15 as in the first embodiment of my invention and one spool holder 83 may be relatively fixed in position, this spool holder preferably having slots 84 into which the lugs 19 of the magazine section 14 are adapted to snap.

There is a movable spool holding device 85 carried on the ends of arms 86 pivoted at 87 to the camera body 80. This spool holder is connected by means of an arm 88 pivotally attached at 89 to the camera back 81 and pivotally attached at 90 to the spool holder. This spool holder has a slot 91 adapted to receive a formed-up lug 92 on the magazine section 15.

With the parts as shown in Figure 13, the magazine 14—15 can be readily inserted by thrusting the magazine in the direction shown by the arrow until the various inter-engaging lugs and slots snap into place. With the parts in this position, it is then only necessary to swing the camera back 81 about its pivot 82 to close the camera, and this action will stretch the strip material across the exposure frame 93 and across the guide rollers 94 in position for exposure.

It will be seen from the foregoing specification that my invention is susceptible of taking many forms. Several forms of film package which can be used with cameras constructed in accordance with my invention have been described, it being understood that the film package per se will be the subject of a separate application.

A number of different forms of camera which will thread itself have been described by way of example, although it is quite evident that still other forms of my invention can be worked out which may come within the scope of the appended claims.

All of the forms of my self-threading camera have at least one feature in common, and that is that by moving one part of the camera relative to another part of the camera, the holding devices are so positioned that a film magazine or package may be loaded as a single unit into the holders without any of the usual trouble of positioning spools, stretching the backing paper, threading it into a take-up spool, and replacing a removable camera back such as customary with roll holding cameras. Not only do cameras constructed in accordance with my invention stretch a film across the exposure frame for exposure, but after the film has been exposed and wound up, the camera, by the act of moving one camera part relative to another, definitely closes the film magazine so that the film will be contained in the light-tight container.

It is therefore possible to load and unload a roll holding camera very quickly. The film is protected much better in a camera of this type than in the usual type because there is no possibility of the film becoming unwound during the loading operation.

Having thus described my invention, what I claim as new and desire to secure by Letters Patent of the United States is:

1. In a roll holding camera, the combination with a camera body having an exposure frame, film chambers, and an opening through which said film chambers are accessible, of a cover adapted to move relative to said camera to cover said opening, mechanism inside of said camera adapted to receive a two-part film package, and connections between said mechanism and said cover for stretching film across said exposure frame and delivering one part of said film package in each film chamber.

2. In a roll holding camera, the combination with a camera body having film chambers and an opening in one side, of a camera part adapted to move relative to said camera to open and close said opening, self-threading mechanism carried by said camera and operably connected to said movable camera part adapted to receive a two-part film package, and through movement of the movable camera part move to position each of the two parts of the film package one in each spool chamber.

3. In a roll holding camera, the combination with a camera body having an exposure frame, film chambers, and an opening through which said film chambers are accessible, of a cover for said opening, mechanism carried by the camera for holding two parts of a film package in the film chambers, and connections between said cover and said mechanism for moving said mechanism with said cover for moving the two parts of the film package into contact.

4. In a roll holding camera, the combination with a camera body having an exposure frame, film chambers, and an opening through which said film chambers are accessible, of a cover for said opening, mechanism including relatively movable film holding devices for holding parts of a two-part film package in the camera film chambers, a connection between at least one film holding device and the cover for moving one film holding device into contact with the other whereby the two parts of the film package may also be brought together.

5. In a roll holding camera, the combination with a camera body having an exposure frame, film chambers, and an opening through which said film chambers are accessible, of a cover for said opening, mechanism including relatively movable film holding devices for holding parts of a two-part film package in the camera film chambers, a connection between at least one film holding device and the cover for moving one film holding device into contact with the other whereby the two parts of the film package may also be brought together, and means tending to retain the spool holding device in contact.

6. In a roll holding camera, the combination with a camera having an exposure frame, film chambers, and an opening through which said film chambers are accessible, of a cover for said opening, two pairs of spaced plates constituting film holding devices, a pivotal connection between a spool holding device and the camera, a pivot and link connection between said spool holding device and the cover whereby movement of the latter will move the former, and the cover may bring said spool holding devices into contact.

7. In a roll holding camera, the combination with a camera having an exposure frame, film chambers, and an opening through which said film chambers are accessible, of a cover for said opening, two pairs of spaced plates constituting film holding devices, pivotal connections between each film holding device and the camera upon which said film holding devices can swing from a position in contact to receive a two-part film package to a position in said film chambers, and means including a connection with said cover for moving the film holders.

8. In a roll holding camera, the combination with a two-part roll film magazine having parts adapted to lie in contact but capable of being separated and containing a film strip, of a camera having film chambers, an exposure frame and film holding devices, of means included in the camera for automatically separating the two-part film magazine and stretching the film strip across the exposure frame.

9. In a roll holding camera, the combination with a two-part roll film magazine having parts adapted to lie in contact but capable of being separated and containing a film strip, of a camera having film chambers, an exposure frame and film holding devices, of means included in the camera for automatically separating the two-part film magazine and stretching the film strip across the exposure frame, said means including a pair of cooperating and inter-engaging members carried by the film holders and magazine parts whereby said magazine parts may be retained in a fixed position on said film holders.

10. In a roll holding camera, the combination with a two-part roll film magazine having parts adapted to lie in contact but capable of being separate and containing a film strip, of a camera having film chambers, an exposure frame and film holding devices, of means included in the camera for automatically separating the two-part film magazine and stretching the film strip across the exposure frame, said means including cooperating formings on the magazine parts and film holders adapted to latch said parts together.

11. In a roll holding camera, the combination with a two-part roll film magazine having parts adapted to lie in contact but capable of being separated and containing a film strip, formings on said magazine sections, of a camera having a pair of relatively movable film holders adapted to be brought into contact, each film holder including formings complementary to the formings on said magazine whereby said magazine sections may be separately engaged by said film holders.

12. In a roll holding camera, the combination with a two-part roll film magazine having parts adapted to lie in contact and containing a film strip, formings on said magazine sections, of a camera having a pair of relatively movable film holders adapted to be brought into contact, each film holder including formings complementary to the formings on said magazine, and all of said formings being so positioned and arranged that said two-part magazine may be thrust into said film holders as a unit, with each section definitely engaged in a film holder.

13. In a roll holding camera, the combination with a two-part roll film magazine having parts adapted to lie in contact but capable of being separated and containing a film strip, formings on said magazine sections adapted to latch the sections together, additional formings on said magazine, a camera having a pair of relatively movable film holders, means included in the holders for engaging the additional magazine formings and adapted to latch one section of said magazine to each film holder.

14. In a roll holding camera, the combination with a two-part roll film magazine having parts normally held together but capable of being separated and containing a film strip, of a camera having film chambers, of film holding devices mounted therein, at least one holder being movably mounted with respect to the other holder and being movable to a loading position adjacent the first holder, and means for definitely holding a part of each of the two-part magazine in each of the film holders, whereby film may be stretched between the film chambers by moving one holder relative to the other towards said film chambers.

15. In a roll holding camera, the combination with a two-part roll film magazine having parts normally held together but capable of being separated and containing a film strip, of a camera having film chambers, of film holding devices mounted therein, at least one holder being movably mounted with respect to the other holder and being movable to a loading position adjacent the first holder, and means for definitely holding a part of each of the two-part magazine in each of the film holders, said means including cooperating inter-engaging members on said film magazine and film holders.

16. In a roll holding camera, the combination with a two-part roll film magazine having parts normally held together but capable of being separated and containing a film strip, of a camera having film chambers, of film holding devices mounted therein, at least one holder being movably mounted with respect to the other holder and being movable to a loading position adjacent the first holder, and means for definitely holding a part of each of the two-part magazine in each of the film holders, said means including cooperating members on the parts of the film magazine and film holders adapted to slide into a latching position.

17. In a roll holding camera, the combination with a two-part roll film magazine having parts normally held together but capable of being separated and containing a film strip, of a camera having film chambers, of film holding devices mounted therein, at least one holder being movably mounted with respect to the other holder and being movable to a loading position adjacent the first holder, and means for definitely holding a part of each of the two-part magazine in each of the film holders in a direction crossing the direction of movement of the relatively movable film holder.

18. In a roll holding camera, the combination with a two-part film magazine having parts normally held together but capable of being separated and containing a film strip, of a camera having film chambers, of film holding devices mounted on the camera and lying in said film chambers, pivoted arms carrying the holding devices, gearing connecting the arms to move together to a loading position adjacent each other for receiving the two-part film magazine as a unit.

19. In a roll holding camera, the combination with a two-part film magazine having parts normally held together but capable of being separated and containing a film strip, of a camera having film chambers, of film holding devices mounted on the camera and lying in said film chambers, one spool holding device being fixedly mounted in the camera and the other being movably mounted on arms pivoted to the camera and being adapted to swing to and from a loading position adjacent the fixed holding device in which said film magazine may be loaded into said holding devices as a unit.

20. In a roll holding camera, the combination with a two-part film magazine having parts normally held together but capable of being separated and containing a film strip, of a camera having film chambers, said camera including a part movable relative to the camera part carrying said film chambers, a pair of arms hinged to said last mentioned camera part, film holding devices carried by said hinged arms, and means included in the first mentioned camera part and the hinged arms for guiding the latter to a loading position in which said spool holding devices lie adjacent to receive the film magazine as a unit, as the second mentioned camera part is moved relatively to the first mentioned camera part.

21. In a roll holding camera, the combination with a camera body having an exposure frame, film chambers, and an opening through which said film chambers are accessible for loading, of a cover for said opening, mechanism including film holding devices movably carried by the camera for positioning film in said spool chambers, means for moving the film holding devices and means for latching said film holding devices in a position to receive a two part film package as a unit.

22. In a roll holding camera, the combination with a camera body having an exposure frame, film chambers, and an opening through which said film chambers are accessible for loading, of a cover for said opening, pairs of film holding devices movably mounted on the camera and adapted to move to a film exposure position on the film chambers and to a film loading position, and a latch for holding said film holders in said last named position.

23. A camera body including chambers at the ends thereof, holders mounted on movable supports movable between two extreme positions, at one of which the holders will lie within the respective chambers and at the other of which they will lie closely adjacent one another, and connections between the supports whereby they may be simultaneously moved from one extreme position to the other.

JOSEPH MIHALYI.